US012520100B2

(12) United States Patent
Gao

(10) Patent No.: US 12,520,100 B2
(45) Date of Patent: Jan. 6, 2026

(54) METHOD, DEVICE, STORAGE MEDIUM, AND HEADPHONES OF HEADPHONE VIRTUAL SPATIAL SOUND PLAYBACK

(71) Applicants: Jingyuan Gao, Guangzhou (CN); Guangzhou Synergy Info-Tech Ltd., Guangzhou (CN)

(72) Inventor: Jingyuan Gao, Guangzhou (CN)

(73) Assignees: Jingyuan Gao, Guangzhou (CN); Guangzhou Synergy Info-Tech Ltd., Guangzhou (CN)

( * ) Notice: Subject to any disclaimer, the term of this patent is extended or adjusted under 35 U.S.C. 154(b) by 181 days.

(21) Appl. No.: 18/685,843

(22) PCT Filed: Oct. 21, 2021

(86) PCT No.: PCT/CN2021/125220
§ 371 (c)(1),
(2) Date: Feb. 22, 2024

(87) PCT Pub. No.: WO2023/010691
PCT Pub. Date: Feb. 9, 2023

(65) Prior Publication Data

US 2024/0236613 A1 Jul. 11, 2024

(30) Foreign Application Priority Data

Aug. 5, 2021 (CN) ......................... 202110896744.6

(51) Int. Cl.
*H04S 7/00* (2006.01)
*H04R 5/033* (2006.01)
*H04S 3/00* (2006.01)

(52) U.S. Cl.
CPC ............. *H04S 7/307* (2013.01); *H04R 5/033* (2013.01); *H04S 3/008* (2013.01); *H04S 7/304* (2013.01);

(Continued)

(58) Field of Classification Search
None
See application file for complete search history.

(56) References Cited

U.S. PATENT DOCUMENTS 8,428,269 B1 * 4/2013 Brungart ................ H04S 7/304 340/963
2008/0031462 A1 * 2/2008 Walsh ..................... H04S 1/002 381/17

(Continued)

FOREIGN PATENT DOCUMENTS

CN 101040565 A 9/2007
CN 101511047 A 8/2009

(Continued)

*Primary Examiner* — Duc Nguyen
*Assistant Examiner* — Assad Mohammed
(74) *Attorney, Agent, or Firm* — MUNCY, GEISSLER, OLDS & LOWE, P.C.

(57) ABSTRACT

A method of headphone virtual spatial sound playback, which includes: performing filtering on an input original sound signal $A_0$ through a timbre equalization function C based on spatial orientation information of an intended virtual sound source, to obtain an equalized sound signal $A_C$; then filtering the equalized sound signal $A_C$ through an HRTF function, and outputting a left ear sound signal $A_L$ and a right ear sound signal $A_R$; wherein, the spatial orientation information of the intended virtual sound source comprises a horizontal orientation angle θ and a vertical orientation angle φ; the relationship between the equalized sound signal $A_C$ and the original sound signal $A_0$ is expressed as: $A_C=A_0C$. The disclosure enables an original sound signal to produce spatial auditory effect through HRTF function filtering, performs timbre equalization on the original sound signal and reduces timbre change in virtual space sound playback, and does not affect or change the spatial positioning performance of the original HRTF.

17 Claims, 7 Drawing Sheets

(52) U.S. Cl.
CPC ....... *H04S 2400/01* (2013.01); *H04S 2400/11* (2013.01); *H04S 2400/13* (2013.01); *H04S 2420/01* (2013.01)

(56) References Cited

U.S. PATENT DOCUMENTS

| | | | |
|---|---|---|---|
| 2008/0049948 | A1 | 2/2008 | Christoph et al. |
| 2017/0208392 | A1 | 7/2017 | Smithers et al. |

FOREIGN PATENT DOCUMENTS

| | | | |
|---|---|---|---|
| CN | 101835072 | A | 9/2010 |
| CN | 104581610 | A | 4/2015 |
| CN | 107450819 | A | 12/2017 |
| CN | 111556425 | A | 8/2020 |
| CN | 111587582 | A | 8/2020 |
| CN | 113038355 | A | 6/2021 |
| CN | 113170271 | A | 7/2021 |
| TW | 391148 | B | 5/2000 |

* cited by examiner

METHOD, DEVICE, STORAGE MEDIUM, AND HEADPHONES OF HEADPHONE VIRTUAL SPATIAL SOUND PLAYBACK

CROSS-REFERENCE TO RELATED APPLICATIONS

This application claims priority to PCT Application No. PCT/CN2021/125220 filed on Oct. 21, 2021, which claims priority to Chinese Patent Application No. 202110896744.6 filed on Aug. 5, 2021, the entire contents of both of which are hereby incorporated by reference.

FIELD OF TECHNOLOGY

The disclosure relates to the technical field of virtual auditory technology, particularly to a method, device, and storage medium of headphone virtual spatial sound playback after timbre equalization, as well as headphones with virtual spatial sound playback effect.

BACKGROUND

Virtual spatial sound playback technology simulates the acoustic transmission process from a sound source to both ears. This technology processes original sound signal, which lacks spatial auditory effects, to produce a corresponding spatial auditory sensation during headphone playback. As shown in FIG. 1, existing virtual spatial sound playback technology mainly uses the head-related transfer function (HRTF) to filter the original sound signal $A_0$, control and generate equivalent binaural sound pressure, to obtain binaural sound signals with spatial auditory effect. These signals are outputted through headphones as left ear sound signal $A_L'$ and right ear sound signal $A_R'$, allowing the listener to perceive the sound as coming from a specific spatial orientation. The HRTF function is the acoustic transfer function from a simulated sound source to both ears in a free field, including HRTF left ear function and HRTF right ear function. Using the HRTF function can realize immersive sound effects akin to cinema in portable mobile devices.

However, since the HRTF function must change the frequency response curve of the input original sound signal $A_0$ to convey 3D spatial positioning cues, producing 3D spatial playback effects with the HRTF function inevitably leads to spectral distortion of the sound signal, especially in the mid and high-frequency sections of the sound spectrum. This spectral distortion manifests as a change in timbre during playback. Currently, producing 3D spatial playback effects using the HRTF function while maintaining unchanged timbre is a contradictory technical problem.

SUMMARY

The purpose of the disclosure is to overcome the shortcomings and deficiencies of prior art, providing a method of headphone virtual spatial sound playback that can further improve the timbre of spatial sound playback while flexibly adapting to various sound effect requirements.

This disclosure is implemented by the following technical solutions:

A method of headphone virtual spatial sound playback, including:

Performing filtering on an input original sound signal $A_0$ through a timbre equalization function (based on spatial orientation information of an intended virtual sound source, to obtain an equalized sound signal $A_C$; then filtering the equalized sound signal $A_C$ through an HRTF function, and outputting a left ear sound signal $A_L$ and a right ear sound signal $A_R$.

Wherein, the spatial orientation information of the intended virtual sound source comprises a horizontal orientation angle θ and a vertical orientation angle φ; the relationship between the equalized sound signal $A_C$ and the original sound signal $A_0$ is expressed as: $A_C=A_C$;

The timbre equalization function C is expressed as:

$$C=\begin{cases} G_0 & , \ f<f_0 \\ \frac{G_0 K_0}{H} & , \ f\geq f_0 \end{cases},$$

Wherein f is frequency of the original sound signal $A_0$, $f_0$ is a crossover point, H is amplitude spectrum of the HRTF function, $K_0$ is an equalization gain factor, $G_0$ is an overall gain factor.

Relative to prior art, this disclosure allows an original sound signal with no spatial auditory effect to produce spatial auditory effect through HRTF function filtering while reducing timbre changes in virtual spatial sound playback. The method does not affect or change the spatial positioning performance of the original HRTF.

In an alternative embodiment, wherein the original sound signal comprises at least two parallel sub original sound signals, each of the sub original sound signals corresponding to spatial orientation information of a sub intended virtual sound source; performing filtering on each of the sub original sound signals through the timbre equalization function C to obtain the corresponding sub equalized sound signal; then filtering each sub equalized sound signal through the HRTF function to obtain the corresponding sub left ear sound signal and sub right ear sound signal.

In an alternative embodiment, wherein the value of the crossover point to is any frequency value within a specific range of 400 Hz≤$f_0$≤1.5 kHz.

In an alternative embodiment, wherein the expression of the equalization gain factor $K_0$ is:

$$K_0=\begin{cases} 1 & , \ -150^\circ\leq\theta\leq-30^\circ \bigcup 30^\circ\leq\theta\leq150^\circ \\ \frac{H_{f_0}}{\sqrt{|H_{Lf_0}|^2+|H_{Rf_0}|^2}} & , \ -180^\circ\leq\theta<-150^\circ \bigcup -30^\circ<\theta<30^\circ \bigcup 150<\theta\leq180^\circ \end{cases},$$

Wherein $H_{f_0}$ is the value $H(\theta,\varphi,f_0)$ of the amplitude spectrum H of the HRTF function at the crossover point $f_0$, $H_{Lf_0}$ is the value $H_L(\theta,\varphi,f_0)$ of HRTF left ear function at the crossover point $f_0$, $H_{Rf_0}$ is the value $H_R(\theta,\varphi,f_0)$ of HRTF right ear function at the crossover point $f_0$.

In an alternative embodiment, wherein the expression of the equalization gain factor $K_0$ is:

$$K_0 = \begin{cases} 1 & , -150° \le \theta \le -30° \cup 30° \le \theta \le 150° \\ \left[\frac{\sqrt{2}}{2}, 1\right) & , -180° \le \theta < -150° \cup -30° < \theta < 30° \cup 150 < \theta \le 180° \end{cases}.$$

The equalization gain factor $K_0$ can be set to a value adjusted by the listener according to their own needs.

Based on the same inventive concept, the disclosure also provides a device of headphone virtual spatial sound playback, including: A timbre equalization filter module and an HRTF filter module; The timbre equalization filter module is configured to obtain an original sound signal $A_0$ and spatial orientation information of an intended virtual sound source, to perform filtering on the original sound signal $A_0$ through a timbre equalization function C based on the spatial orientation information of the intended virtual sound source, and to obtain an equalized sound signal $A_C$; The HRTF filter module is configured to filter the equalized sound signal $A_C$ through an HRTF function, and to output a left ear sound signal $A_L$ and a right ear sound signal $A_R$.

Wherein, the spatial orientation information of the intended virtual sound source comprises a horizontal orientation angle θ and a vertical orientation angle φ; the relationship between the equalized sound signal $A_C$ and the original sound signal $A_0$ is expressed as: $A_C=A_0C$; The timbre equalization function (is expressed as:

$$C = \begin{cases} G_0 & , f < f_0 \\ \frac{G_0K_0}{H} & , f \ge f_0 \end{cases},$$

Wherein f is frequency of the original sound signal $A_0$, $f_0$ is a crossover point, H is amplitude spectrum of the HRTF function, $K_0$ is an equalization gain factor, $G_0$ is an overall gain factor.

In an alternative embodiment, wherein the original sound signal comprises at least two parallel sub original sound signals, each of the sub original sound signals corresponding to spatial orientation information of a sub intended virtual sound source; performing filtering on each of the sub original sound signals through the timbre equalization function C to obtain the corresponding sub equalized sound signal; then filtering each sub equalized sound signal through the HRTF function to obtain the corresponding sub left ear sound signal and sub right ear sound signal.

In an alternative embodiment, wherein the expression of the equalization gain factor $K_0$ is:

$$K_0 = \begin{cases} 1 & , -150° \le \theta \le -30° \cup 30° \le \theta \le 150° \\ \frac{H_{f_0}}{\sqrt{|H_{Lf_0}|^2 + |H_{Rf_0}|^2}} & , -180° \le \theta < -150° \cup -30° < \theta < 30° \cup 150 < \theta \le 180° \end{cases},$$

Wherein $H_{f_0}$ is the value $H(\theta,\varphi,f_0)$ of the amplitude spectrum H of the HRTF function at the crossover point $f_0$, $H_{Lf_0}$ is the value $H_L(\theta,\varphi,f_0)$ of HRTF left ear function at the crossover point $f_0$, $H_{Rf_0}$ is the value $H_R(\theta,\varphi,f_0)$ of HRTF right ear function at the crossover point $f_0$.

In an alternative embodiment, wherein the expression of the equalization gain factor $K_0$ is $$K_0 = \begin{cases} 1 & , -150° \le \theta \le -30° \cup 30° \le \theta \le 150° \\ \left[\frac{\sqrt{2}}{2}, 1\right) & , -180° \le \theta < -150° \cup -30° < \theta < 30° \cup 150 < \theta \le 180° \end{cases}.$$

The equalization gain factor $K_0$ can be set to a value adjusted by the listener according to their own needs.

Based on the same inventive concept, the disclosure also provides a storage medium of headphone virtual spatial sound playback. The storage medium serves as a computer-readable storage medium used for storing programs. The programs include: performing filtering on an input original sound signal $A_0$ through a timbre equalization function C based on spatial orientation information of an intended virtual sound source, to obtain an equalized sound signal $A_C$; then filtering the equalized sound signal $A_C$ through an HRTF function, and outputting a left ear sound signal $A_L$ and a right ear sound signal $A_R$;

Wherein, the spatial orientation information of the intended virtual sound source comprises a horizontal orientation angle θ and a vertical orientation angle φ; the relationship between the equalized sound signal $A_C$ and the original sound signal $A_0$ is expressed as: $A_C=A_0C$.

The timbre equalization function C is expressed as:

$$C = \begin{cases} G_0 & , f < f_0 \\ \frac{G_0K_0}{H} & , f \ge f_0 \end{cases},$$

Wherein f is frequency of the original sound signal $A_0$, $f_0$ is a crossover point, H is amplitude spectrum of the HRTF function, $K_0$ is an equalization gain factor, $G_0$ is an overall gain factor.

In an alternative embodiment, wherein the original sound signal comprises at least two parallel sub original sound signals, each of the sub original sound signals corresponding to spatial orientation information of a sub intended virtual sound source; performing filtering on each of the sub original sound signals through the timbre equalization function C to obtain the corresponding sub equalized sound signal; then filtering each sub equalized sound signal through the HRTF function to obtain the corresponding sub left ear sound signal and sub right ear sound signal.

In an alternative embodiment, wherein the value of the crossover point $f_0$ is any frequency value within a specific range of $400\ Hz \le f_0 \le 1.5\ kHz$.

In an alternative embodiment, wherein the expression of the equalization gain factor $K_0$ is:

$$K_0 = \begin{cases} 1 & , -150° \le \theta \le -30° \cup 30° \le \theta \le 150° \\ \frac{H_{f_0}}{\sqrt{|H_{Lf_0}|^2 + |H_{Rf_0}|^2}} & , -180° \le \theta < -150° \cup -30° < \theta < 30° \cup 150 < \theta \le 180° \end{cases},$$

Wherein $H_{f_0}$ is the value $H(\theta,\varphi,f_0)$ of the amplitude spectrum H of the HRTF function at the crossover point $f_0$, $H_{Lf_0}$ is the value $H_L(\theta,\varphi,f_0)$ of HRTF left ear function at the crossover point $f_0$, $H_{Rf_0}$ is the value $H_R(\theta,\varphi,f_0)$ of HRTF right ear function at the crossover point $f_0$.

In an alternative embodiment, wherein the expression of the equalization gain factor $K_0$ is $$K_0 = \begin{cases} 1 & , -150° \le \theta \le -30° \cup 30° \le \theta \le 150° \\ \left[\frac{\sqrt{2}}{2}, 1\right) & , -180° \le \theta < -150° \cup -30° < \theta < 30° \cup 150 < \theta \le 180° \end{cases}.$$

Based on the same inventive concept, the disclosure also provides headphones with virtual spatial sound playback effect. The headphones include a device of headphone virtual spatial sound playback, a left ear speaker, and a right ear speaker. The device of headphone virtual spatial sound playback includes a timbre equalization filter module and an HRTF filter module. The timbre equalization filter module is configured to obtain an original sound signal $A_0$ and spatial orientation information of an intended virtual sound source, to perform filtering on the original sound signal $A_0$ through a timbre equalization function C based on the spatial orientation information of the intended virtual sound source, and to obtain an equalized sound signal $A_C$; the HRTF filter module is configured to filter the equalized sound signal $A_C$ through an HRTF function, and to output a left ear sound signal $A_L$ and a right ear sound signal $A_R$;

Wherein, the spatial orientation information of the intended virtual sound source comprises a horizontal orientation angle θ and a vertical orientation angle φ; the relationship between the equalized sound signal $A_C$ and the original sound signal $A_0$ is expressed as: $A_C=A_0C$.

The timbre equalization function (is expressed as:

$$C = \begin{cases} G_0 & , f < f_0 \\ \frac{G_0 K_0}{H} & , f \ge f_0 \end{cases},$$

Wherein f is frequency of the original sound signal $A_0$, $f_0$ is a crossover point, H is amplitude spectrum of the HRTF-function, $K_0$ is an equalization gain factor, $G_0$ is an overall gain factor.

In an alternative embodiment, wherein the original sound signal comprises at least two parallel sub original sound signals, each of the sub original sound signals corresponding to spatial orientation information of a sub intended virtual sound source; performing filtering on each of the sub original sound signals through the timbre equalization function C to obtain the corresponding sub equalized sound signal; then filtering each sub equalized sound signal through the HRTF function to obtain the corresponding sub left ear sound signal and sub right ear sound signal.

In an alternative embodiment, wherein the value of the crossover point $f_0$ is any kHz frequency value within a specific range of 400 Hz≤$f_0$≤1.5 kHz.

In an alternative embodiment, wherein the expression of the equalization gain factor $K_0$ is:

$$K_0 = \begin{cases} 1, & -150° \le \theta \le -30° \cup 30° \le \theta \le 150° \\ \frac{H_{f_0}}{\sqrt{|H_{Lf_0}|^2 + |H_{Rf_0}|^2}}, & -180° \le \theta < -150° \cup -30° < \theta < 30° \cup 150° < \theta \le 180° \end{cases},$$

Wherein $H_{f_0}$ is the value $H(\theta,\varphi,f_0)$ of the amplitude spectrum H of the HRTF function at the crossover point $f_0$, $H_{Lf_0}$ is the value $H_L(\theta,\varphi,f_0)$ of HRTF left ear function at the crossover point $f_0$, $H_{Rf_0}$ is the value $H_R(\theta,\varphi,f_0)$ of HRTF right ear function at the crossover point $f_0$.

In an alternative embodiment, wherein the expression of the equalization gain factor $K_0$ is $$K_0 = \begin{cases} 1, & -150° \le \theta \le -30° \cup 30° \le \theta \le 150° \\ \left[\frac{\sqrt{2}}{2}, 1\right), & -180° \le \theta < -150° \cup -30° < \theta < 30° \cup 150° < \theta \le 180° \end{cases}.$$

Based on the same inventive concept, the disclosure also provides a method of timbre equalization in virtual spatial sound playback. The method of timbre equalization in virtual spatial sound playback includes: before filtering a equalized sound signal $A_C$ through an HRTF function, filtering an original sound signal $A_0$ through a timbre equalization function C based on spatial orientation information of an intended virtual sound source, to obtain an equalized sound signal $A_C$;

Wherein, the spatial orientation information of the intended virtual sound source comprises a horizontal orientation angle θ and a vertical orientation angle φ; the relationship between the equalized sound signal $A_C$ and the original sound signal $A_0$ is expressed as: $A_C=A_0C$;

The timbre equalization function C is expressed as:

$$C=\begin{cases}G_0, & f<f_0\\ \frac{G_0K_0}{H}, & f\geq f_0\end{cases},$$

Wherein f is frequency of the original sound signal $A_0$, $f_0$ is a crossover point, H is amplitude spectrum of the HRTF function, $K_0$ is an equalization gain factor, $G_0$ is an overall gain factor.

In an alternative embodiment, wherein the original sound signal comprises at least two parallel sub original sound signals, each of the sub original sound signals corresponding to spatial orientation information of a sub intended virtual sound source; performing filtering on each of the sub original sound signals through the timbre equalization function (to obtain the corresponding sub equalized sound signal; then filtering each sub equalized sound signal through the HRTF function to obtain the corresponding sub left ear sound signal and sub right ear sound signal.

In an alternative embodiment, wherein the value of the crossover point $f_0$ is any frequency value within a specific range of 400 Hz≤$f_0$≤1.5 kHz.

In an alternative embodiment, wherein the expression of the equalization gain factor $K_0$ is:

$$K_0=\begin{cases}1, & -150^\circ\leq\theta\leq-30^\circ\cup30^\circ\leq\theta\leq150^\circ\\ \frac{H_{f_0}}{\sqrt{|H_{Lf_0}|^2+|H_{Rf_0}|^2}}, & -180^\circ\leq\theta<-150^\circ\cup-30^\circ<\theta<30^\circ\cup150^\circ<\theta\leq180^\circ\end{cases},$$

Wherein $H_{f_0}$ is the value $H(\theta,\varphi,f_0)$ of the amplitude spectrum H of the HRTF function at the crossover point $f_0$, $H_{Lf_0}$ is the value $H_L(\theta,\varphi,f_0)$ of HRTF left ear function at the crossover point $f_0$, $H_{Rf_0}$ is the value $H_R(\theta,\varphi,f_0)$ of HRTF right ear function at the crossover point $f_0$.

In an alternative embodiment, wherein the expression of the equalization gain factor $K_0$ is $$K_0=\begin{cases}1, & -150^\circ\leq\theta\leq-30^\circ\cup30^\circ\leq\theta\leq150^\circ\\ \left[\frac{\sqrt{2}}{2},1\right), & -180^\circ\leq\theta<-150^\circ\cup-30^\circ<\theta<30^\circ\cup150^\circ<\theta\leq180^\circ\end{cases}.$$

The following is the detailed description of the technical solution of this disclosure in conjunction with the drawings.

DETAILED DESCRIPTION

The concept of the disclosure is based on processing the input original sound signal by the head-related transfer function (HRTF) while performing timbre equalization on the original sound signal to adjust its timbral distortion effect. The HRTF function is a database obtained through precise experimental measurements, containing all data related to the HRTF function, such as angle, distance, frequency, etc., of the intended virtual sound source. The HRTF left ear function and HRTF right ear function corresponding to spatial orientation information of the intended virtual sound source can be found in the HRTF database. It has been found in studies on processing the original sound signal with the HRTF function that the HRTF function affects the low-frequency and mid-high-frequency sections of the original sound signal differently and mainly causes spectral distortion in the mid-high-frequency section of the original sound signal. Therefore, this disclosure first divides the sound signal into frequency bands, performing different timbre adjustments for low-frequency band and mid-high-frequency band. For the low-frequency band sound signal, an overall gain factor is used for timbre adjustment, and for the mid-high-frequency band sound signal, an overall gain factor and an equalization gain factor are used to compensate for the timbre loss of the original sound signal after HRTF function filtering, to reduce the change in the timbre of the original sound signal.

Based on this, the disclosure provides a method, device, and storage medium of headphone virtual spatial sound playback, as well as headphones with virtual spatial sound playback effects, which are explained through several embodiments.

Embodiment 1

Figure 1:
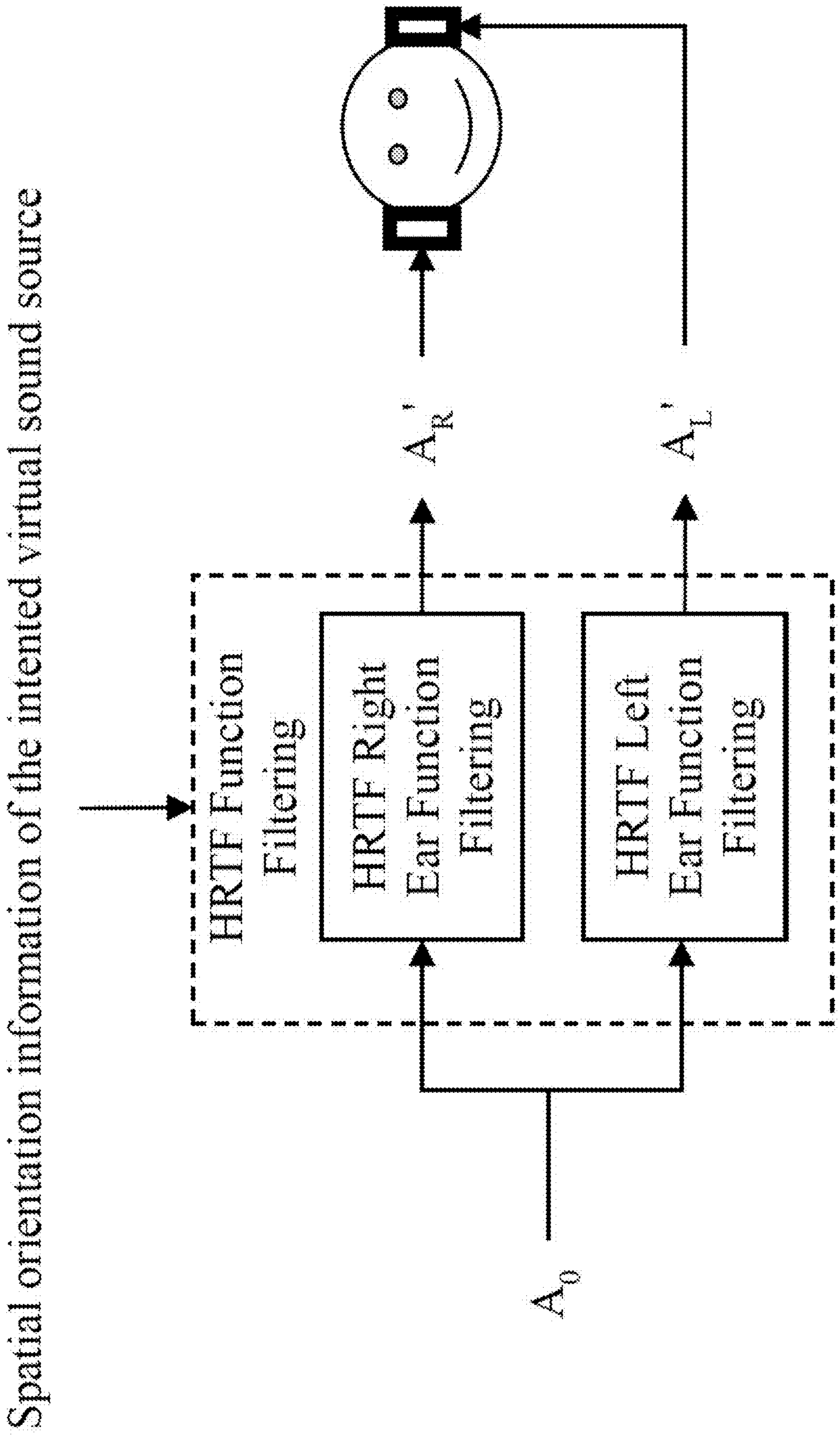
FIG. 1 is a flowchart of the conventional headphone virtual spatial sound playback method.
Figure 2:
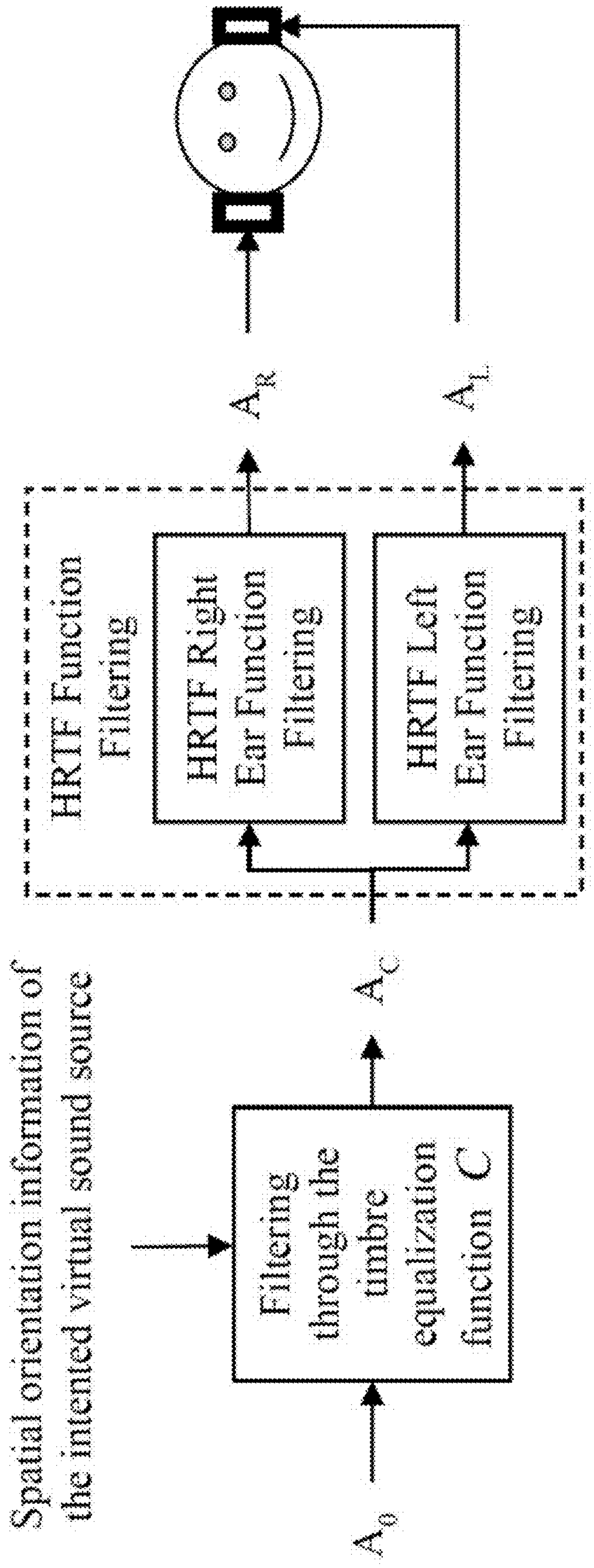
FIG. 2 is a flowchart of the method of headphone virtual spatial sound playback of Embodiment 1 of this disclosure.

Referring to FIG. 2, which is a flowchart of the method of headphone virtual spatial sound playback of Embodiment 1 of this disclosure. The method of headphone virtual spatial sound playback of Embodiment 1 of this disclosure includes the following steps:

S1: Acquiring an original sound signal $A_0$ and spatial orientation information of a intended virtual sound source;

in the step of S1, the acquired original sound signal $A_0$ is a sound signal from a player or system input.

The spatial orientation information of the intended virtual sound source is the spatial orientation information of the virtual sound source that listener expects to obtain after the original sound signal $A_0$ is processed through virtual spatial sound playback. For example, if the listener expects the sound effect after virtual spatial sound playback to seem as if the sound source is coming from directly in front of them, then the spatial orientation information of this front position is defined as the spatial orientation information of the intended virtual sound source.

Figure 3:
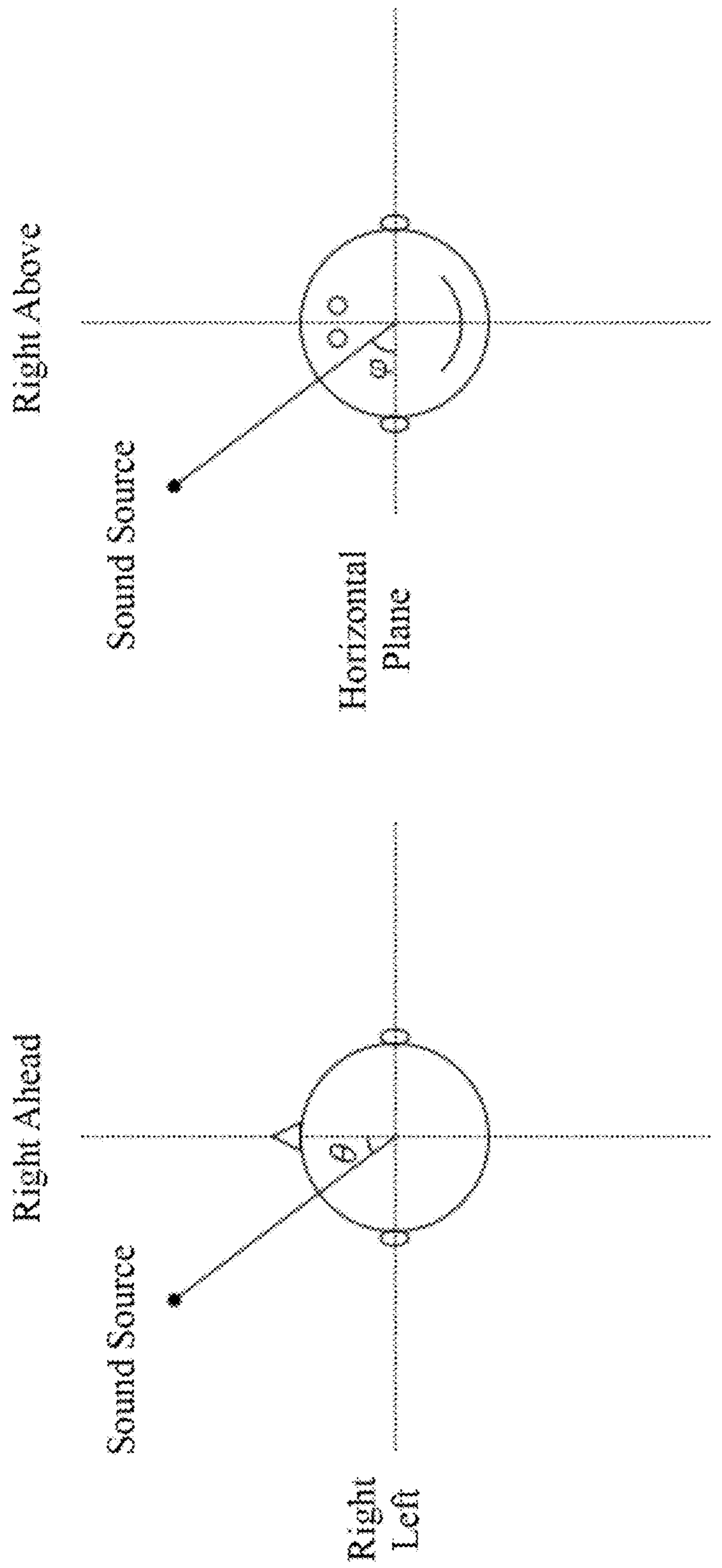
FIG. 3 is a schematic diagram of the spatial coordinate system defining the spatial orientation information.

In this disclosure, the spatial orientation information of the intended virtual sound source is characterized by the horizontal orientation angle θ and the vertical orientation angle φ of the intended virtual sound source relative to the listener's head, taking the listener's head as the reference center. In this embodiment, the spatial orientation information of the intended virtual sound source is defined through a spatial coordinate system. Referring to FIG. 3, which is a schematic diagram of the spatial coordinate system. The spatial coordinate system is centered around the head. The angle between the intended virtual sound source on the horizontal plane and the direction directly in front of the head is taken as the horizontal orientation angle θ. When the intended virtual sound source is expected to be on the left side of the head, the range for the horizontal orientation angle θ is defined 0°≤θ≤180°; when the intended virtual sound source is expected to be on the right side of the head, the range for the horizontal orientation angle θ is defined differently −180°≤θ≤0° The angle between the intended virtual sound source and the horizontal plane is taken as the vertical orientation angle φ. When the intended virtual sound source is above the horizontal plane, the range for the vertical orientation angle φ is defined 0°≤φ≤90°; when the intended virtual sound source is below the horizontal plane, the range for the vertical orientation angle φ is defined differently −90°≤φ≤0°.

In this embodiment, the horizontal orientation angle θ and vertical orientation angle φ of the spatial orientation information of the intended virtual sound source can be adjusted and set by the listener based on his needs regarding the spatial orientation effect of the intended virtual sound source.

S2: Performing timbre equalization filtering on the original sound signal $A_0$ to obtain an equalized sound signal $A_C$;

In the step of S2, performing timbre equalization filtering on the original sound signal $A_0$ in its frequency domain through a timbre equalization function C, to obtain an equalized sound signal $A_C$. The relationship between the equalized sound signal $A_C$ and the original sound signal $A_0$ is expressed as: $A_C=A_0C$.

The expression for the timbre equalization function C is defined as follows:

$$C=\begin{cases} G_0, & f<f_0 \\ \dfrac{G_0K_0}{H}, & f\geq f_0 \end{cases}, \tag{1}$$

Wherein f is frequency of the original sound signal $A_0$, $f_0$ is crossover point, H is amplitude spectrum of HRTF function, $K_0$ is equalization gain factor, and $G_0$ is overall gain factor. The original sound signal $A_0$ which contains signals of different frequencies, is first divided by the timbre equalization function C using the crossover point $f_0$ into two bands of signals: low-frequency band and mid-high frequency band. Adjusting the low-frequency band sound signal of the original sound signal $A_0$ by the overall gain factor $G_0$; adjusting the mid-high frequency band sound signal of the original sound signal $A_0$ by the overall gain factor $G_0$, the equalization gain factor $K_0$, and the amplitude spectrum H of the HRTF function.

In fact, the aforementioned crossover point $f_0$, the amplitude spectrum H of the HRTF function, the equalization gain factor $K_0$, and the overall gain factor $G_0$ set in this disclosure are all related to the horizontal orientation angle θ and the vertical orientation angle φ of the spatial orientation information of the intended virtual sound source. Therefore, the timbre equalization function C changes with the horizontal orientation angle θ and the vertical orientation angle φ of the spatial orientation information of the intended virtual sound source. The following will explain these variables one by one.

Figure 4:
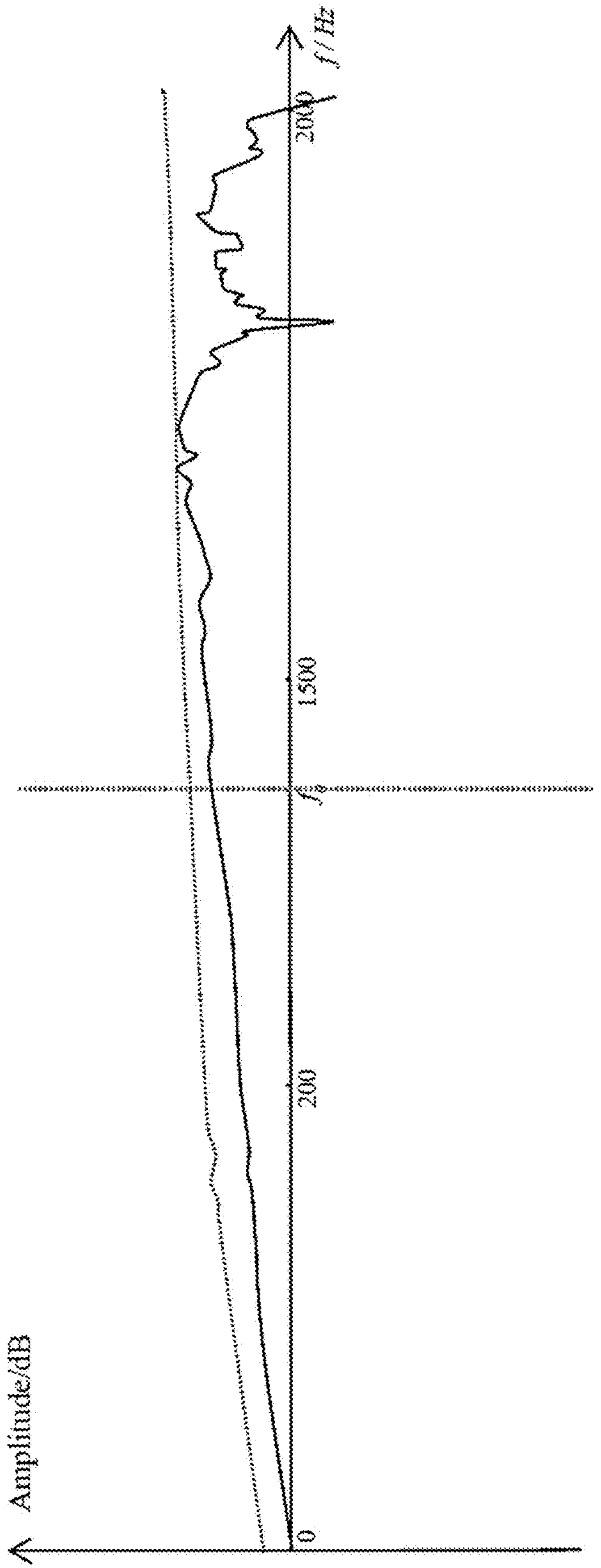
FIG. 4 is a frequency response curve of the HRTF function when the spatial orientation information of the intended virtual sound source is set to the horizontal orientation angle θ=30° and the vertical orientation angle φ=0, and a frequency response curve of the original sound signal $A_0$.

Since the crossover point $f_0$ is related to frequency response curve of the HRTF function, please refer to FIG. 4 before explaining the crossover point $f_0$. The FIG. 4 shows the frequency response curve of the original sound signal $A_0$ (the horizontal orientation angle θ=30° and the vertical orientation angle φ=) and the frequency response curve of the HRTF function on the same side as the intended virtual sound source, wherein the dashed line represents the frequency response curve of the original sound signal $A_0$, and the solid line represents the frequency response curve of the HRTF function on the same side as the intended virtual sound source, i.e., the frequency response curve of the HRTF left ear function. When the sound frequency is less than 200 Hz, the frequency response curve of the HRTF function on the same side as the intended virtual sound source is a flat curve similar to the frequency response curve of the original sound signal $A_0$. This is because when the sound frequency is less than 200 Hz, the wavelength of the sound is larger than the size of the head, and the scattering effect of the head on the sound waves can be ignored. When the sound frequency is greater than 200 Hz and less than 1.5 kHz, the frequency response curve of the HRTF function on the same side as the intended virtual sound source shows a rapid monotonic increase followed by a plateau. Additionally, the frequency response curve of the HRTF function on the opposite side of the intended virtual sound source is attenuated due to the shadow effect of the head. This is because when the sound frequency is greater than 200 Hz and less than 1.5 kHz, the head acts as a kind of approximate mirror reflector for the sound source on the same side of the ear, but the wavelength of the sound is still larger than the size of the head. When the sound frequency is greater than 1.5 kHz, the frequency response curve of the HRTF function on the opposite side of the intended virtual sound source becomes irregular. This is because when the sound frequency is greater than 1.5 kHz, the wavelength of the sound begins to be smaller than the size of the head, and the blocking effect of the head on the sound waves becomes more pronounced at higher frequencies, and the influences of ear canal and pinna on sound waves are more distinctly reflected in the frequency spectrum. Consequently, the frequency response curve of the sound signal processed by the HRTF function starts to distort in the mid-high frequency band, leading to spectral distortion in this band. Therefore, the disclosure divides the frequency domain of the original sound signal $A_0$ into low-frequency band and mid-high frequency band by the crossover point $f_0$ as boundary, applying different timbre equalization processing for the mid-high frequency band compared to the low frequency band.

The crossover point $f_0$ should be selected as the point where the HRTF function's impact on the low and mid-high frequencies of the sound source differs. Based on the analysis, the point typically lies between 200 Hz and 1.5 kHz. Additionally, the point where the HRTF function's impact on the low and mid-high frequencies of the sound source differs is influenced by the spatial orientation information of the intended virtual sound source. After analyzing the characteristics of the HRTF function, the preferred range for the value of the crossover point $f_0$ is determined as 400 Hz≤$f_0$≤1.5 kHz. Since the HRTF function is highly individualized and the design of auditory filters involves multi-dimensional considerations, and because the values that satisfy mathematical and physical optimal designs may not necessarily meet auditory perception needs, in this embodiment, the crossover point $f_0$ can also be adjusted and set according to the listener's personal requirements. Moreover, to achieve specific sound effects desired by the listener, such as when only high-frequency band needs to be equalized gained, the listener can choose the crossover point $f_0$ as 1.5 kHz<$f_0$<20 kHz.

In addition, to maintain the continuity of the timbre equalization function C across the two bands divided by the crossover point $f_0$, interpolation and standard smoothing treatment near the crossover point $f_0$ are necessary.

After determining the crossover point $f_0$, for the signal of low-frequency band that the frequency is less than the crossover point $f_0$, multiplying it by the overall gain factor $G_0$ to adjust sound pressure level of the original sound signal. The overall gain factor $G_0$ is an arbitrary constant that can be set as needed.

For the signal of mid-high-frequency band that the frequency is greater than the crossover point $f_0$, multiplying it by the overall gain factor $G_0$, the equalization gain factor $K_0$ and the reciprocal of the amplitude spectrum H of HRTF function. Wherein, the amplitude spectrum H of HRTF function is that of the HRTF function on the same side as the intended virtual sound source, expressed as:

$$H=\begin{cases}\sqrt{|H_L(\theta,\varphi,f)|^2}, & 0^\circ<\theta<180^\circ\\ \sqrt{|H_R(\theta,\varphi,f)|^2}, & -180^\circ<\theta<0^\circ\\ \sqrt{|H_L(\theta,\varphi,f)|^2}\ \mathrm{OR}\ \sqrt{|H_R(\theta,\varphi,f)|^2}, & \theta=0^\circ\cup\theta=\pm180^\circ\end{cases},\quad(2)$$

Wherein $H_L(\theta,\varphi,f)$ is the HRTF left ear function and $H_R(\theta,\varphi,f)$ is the HRTF right ear function. When the intended virtual sound source is located on the left side of the head, i.e. the horizontal orientation angle θ satisfies inequality of 0°<θ<180°, the amplitude spectrum of HRTF function is taken from the amplitude spectrum of the HRTF left ear function, i.e. $\sqrt{|H_L(\theta,\varphi,f)|^2}$. When the intended virtual sound source is located on the right side of the head, i.e. the horizontal orientation angle θ satisfies inequality of −180°<θ<0°, the amplitude spectrum of HRTF function is taken from the amplitude spectrum of the HRTF right ear function, i.e. $\sqrt{|H_R(\theta,\varphi,f)|^2}$. When the intended virtual sound source is located on the median plane of the head, i.e. the horizontal orientation angle θ satisfies θ=±180° or θ=±180°, the amplitude spectrum of HRTF function is taken from either the amplitude spectrum of the HRTF left ear function or the amplitude spectrum of the HRTF right ear function. Since the HRTF functions are symmetrical or nearly symmetrical, when θ=0° or θ=±180° H can be selected based on actual needs in these scenarios without affecting the implementation of this method.

The selection of the equalization gain factor $K_0$ is related to the spatial orientation of the intended virtual sound source, and its expression is defined as:

$$K_0=\begin{cases}1, & -150^\circ\le\theta\le-30^\circ\cup30^\circ\le\theta\le150^\circ\\ \dfrac{H_{f_0}}{\sqrt{|H_{Lf_0}|^2+|H_{Rf_0}|^2}}, & -180^\circ\le\theta<-150^\circ\cup-30^\circ<\theta<30^\circ\cup150^\circ<\theta\le180^\circ\end{cases},\quad(3)$$

Wherein $H_{f_0}$ is the value $H(\theta,\varphi,f_0)$ of the amplitude spectrum H of the HRTF function at the crossover point $f_0$; $H_{Lf_0}$ is value $H_L(\theta,\varphi,f_0)$ of the HRTF left ear function $H_L$ at the crossover point $f_0$; and $H_{Rf_0}$ is the value $H_R(\theta,\varphi,f_0)$ of the HRTF right ear function H at the crossover point $f_0$.

Figure 5:
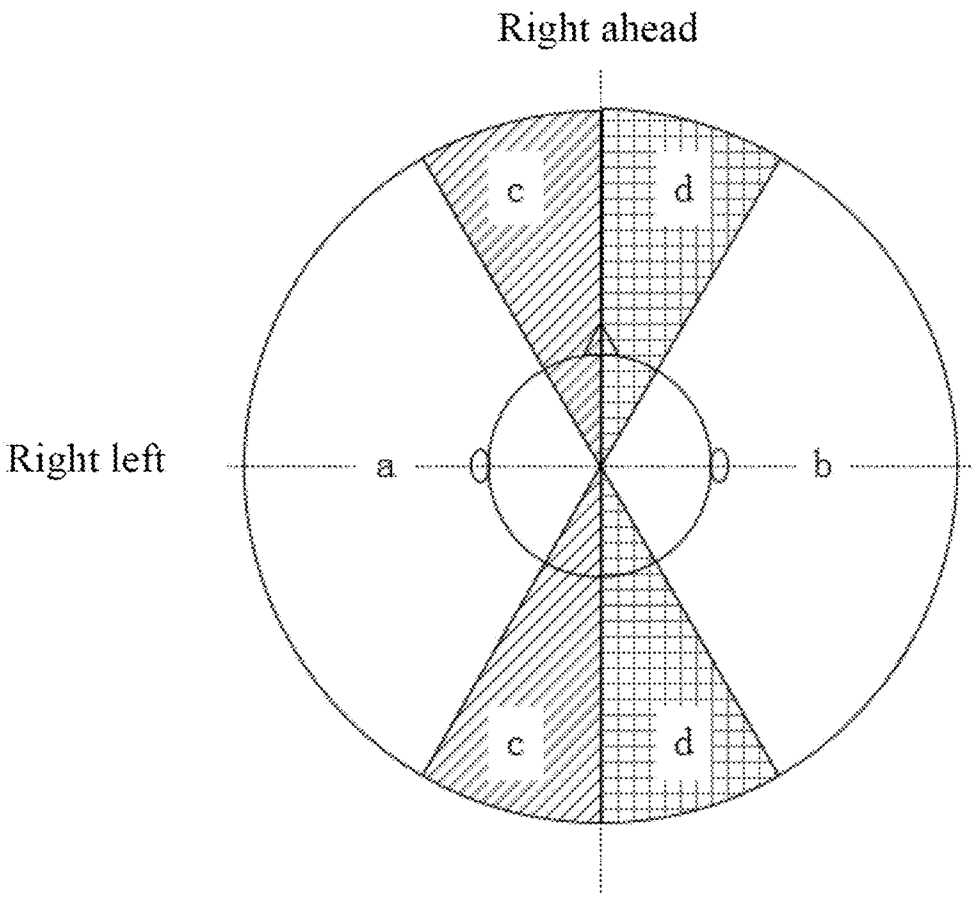
FIG. 5 is a schematic diagram of the horizontal orientation angle θ zoning in spatial coordinate system.

To illustrate the relationship between the equalization gain factor $K_0$ and the horizontal orientation angle θ of the intended virtual sound source, this embodiment divides the spatial coordinate system into zones. Referring to FIG. 5, which is a schematic diagram of the horizontal orientation angle θ zoning in spatial coordinate system. The area near the left ear of the head is marked as zone "a", where the range of the horizontal orientation angle θ is 30°≤θ≤150°; the area near the right ear as zone "b", where the range of the horizontal orientation angle θ is −150°≤θ≤−30°; the area on the left side near the median plane of the head is marked as zone "c", where the range of the horizontal orientation angle θ is 0°≤θ<30° and 150°<θ≤180°; the area on the right side near the median plane is marked as zone "d", where the range of the horizontal orientation angle θ is −180°≤θ<−150° and −30°<θ≤0°.

When the spatial orientation of the intended virtual sound source is set in zone "a" or zone "b", due to the role of the head, the sound pressure level of the mid-high frequency band of the sound reaches the same side ear is much larger than that of the opposite side ear, i.e. the sound pressure level of the mid-high frequency band of the intended virtual sound source reaching the same side ear is also much larger than that of reaching the opposite side ear. It can be approximated that the sound pressure level of the mid-high frequency band of the intended virtual sound source reaching the same side ear is similar to the original sound signal $A_0$. Therefore, the expression for the equalization gain factor $K_0$; $K_0=1$.

When the spatial orientation of the sound source is set in zone "c" or zone "d", the sound pressure level of the mid-high frequency band of the sound reaching the opposite side ear gradually approaches that of the same side ear. That is, the sound pressure level of the mid-high frequency band of the intended virtual sound source reaching the opposite side ear also gradually approaches that of the same side ear. At this time, the sound pressure level of the intended virtual sound source reaching the opposite side ear cannot be ignored anymore. To ensure the energy balance between the low frequency band and mid-high frequency band of the intended virtual sound source, it is necessary to make the sound power reaching both ears from the intended virtual sound source equal to the power of the original sound signal $A_0$ at the crossover point $f_0$, which means adhering to the principle of sound power conservation. Therefore, based on the method, the expression of the equalization gain factor $K_0$ can be obtained as:

$$K_0 = \frac{H_{f_0}}{\sqrt{|H_{Lf_0}|^2 + |H_{Rf_0}|^2}}.$$

Furthermore, to adapt to different timbre equalization needs, when the spatial orientation of the intended virtual sound source is chosen in zone "c" or zone "d", the equalization gain factor $K_0$ can be set to a value adjustable by the listener within a certain range. According to the expression $$K_0 = \frac{H_{f_0}}{\sqrt{|H_{Lf_0}|^2 + |H_{Rf_0}|^2}},$$

the value range for the equalization gain factor $K_0$ can be derived as:

$$\frac{\sqrt{2}}{2} \leq K_0 < 1.$$

Within the value range, the equalization gain factor $K_0$ can achieve the purpose of timbre equalization. When the equalization gain factor $K_0$ is set to be adjustable by the listener, the expression for the equalization gain factor $K_0$ is simplified to: when the spatial orientation of the intended virtual sound source is in zone "a" or zone "b", $K_0=1$; when in zone "c" or zone "d", $K_0$ can be any number within the specified range of $$\left[\frac{\sqrt{2}}{2}, 1\right),$$

so the expression for the freely chosen $K_0$ is:

$$K_0 = \begin{cases} 1, & -150° \leq \theta \leq -30° \cup 30° \leq \theta \leq 150° \\ \left[\frac{\sqrt{2}}{2}, 1\right), & -180° \leq \theta < -150° \cup -30° < \theta < 30° \cup 150° < \theta \leq 180° \end{cases} \tag{4}$$

S3, Filtering the equalized sound signal $A_C$ through a HRTF left ear function and a HRTF right ear function respectively, and obtaining a left ear sound signal $A_L$ and a right ear sound signal $A_R$ respectively.

In the step of S3, the equalized sound signal AC, after being subjected to timbre equalization, is filtered through the HRTF left ear function and the right ear function, eventually obtaining the left ear sound signal AL and the right ear sound signal AR. The left ear sound signal AL, output through the left ear speaker of headphones, is the result of filtering the equalized sound signal AC through the HRTF left ear function. The relationship between the left ear sound signal AL and the equalized signal AC is: $A_L=A_C H_L(\theta,\varphi,f)$. Similarly, the right ear sound signal AR, output through the right earspeaker of headphones, is the result of filtering the equalized sound signal AC through the HRTF right ear function. The relationship between the right ear sound signal AR and the equalized signal AC is: $A_R=A_C H_R(\theta,\varphi,f)$.

Figure 6:
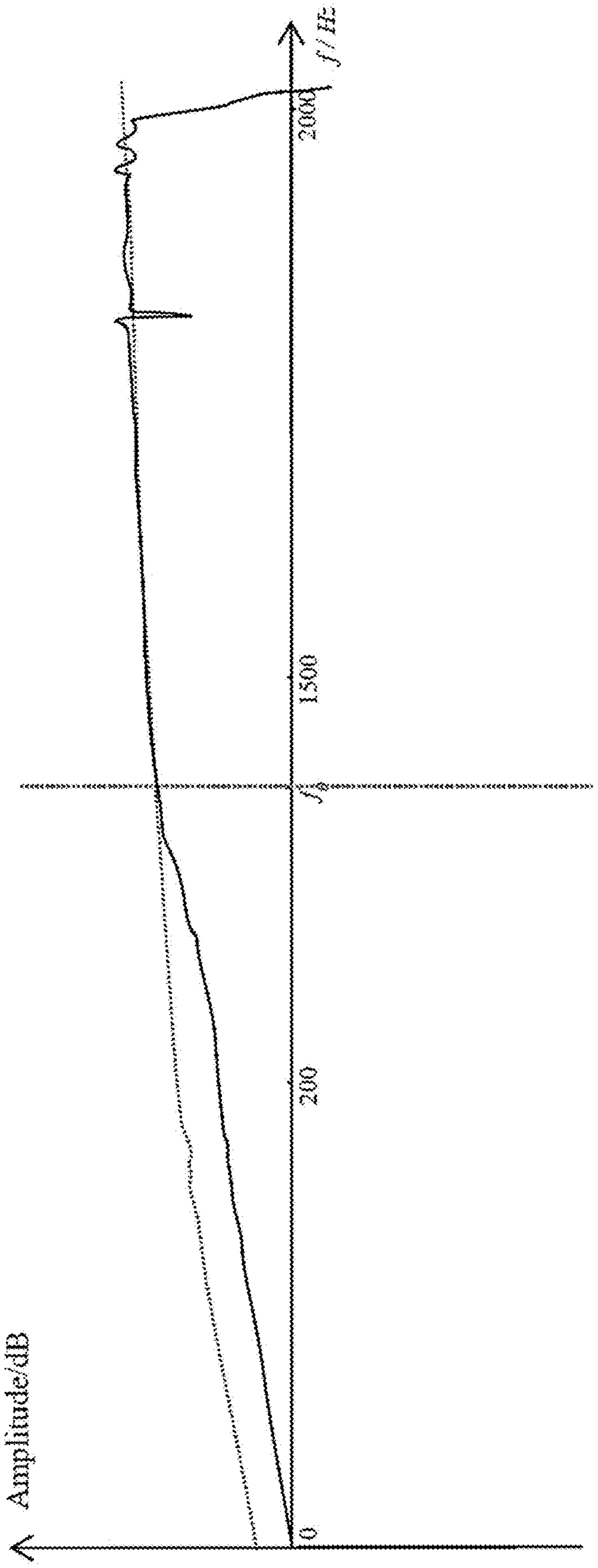
FIG. 6 is a frequency response curve of the original sound signal $A_0$ and a frequency response curve of the left ear sound signal $A_L$ for Embodiment 1, where the spatial orientation of the intended virtual sound source has specific horizontal orientation angle θ=30° and vertical orientation angle φ=0°.

Referring to FIG. 6, which shows the frequency response curves of the original sound signal $A_0$ and the left ear sound signal $A_L$ for Embodiment 1, where the spatial orientation of the intended virtual sound source has specific horizontal orientation angle θ=30° and vertical orientation angle φ=0°. The dashed line represents the frequency response curve of the original sound signal $A_0$, and the solid line represents that of the left ear sound signal $A_L$. As the horizontal orientation angle θ of the spatial orientation information of the intended virtual sound source is 30°, i.e. the intended virtual sound source is located in the left side of the head, the FIG. 6 only compares the frequency curve of the original sound signal $A_0$ and that of the left ear sound signal $A_L$. It can be seen that the mid-high frequency band of the left ear sound signal $A_L$ is similar to that of the original sound signal $A_0$ after timbre equalization, achieving an improvement in timbre.

In summary, during the process of using the method of headphone virtual spatial sound playback with timbre equalization of Embodiment 1, users can first select the spatial orientation (horizontal orientation θ and vertical orientation angle φ) of the intended virtual sound source. The users can also adjust the value of the crossover point $f_0$, the equalization gain factor $K_0$, and the overall gain factor $G_0$ according to their auditory perception needs.

Furthermore, in addition to adjusting for timbre equalization, to meet users' needs for adjusting the pitch, the equalization gain factor $K_0$ can take other values. For instance, when there is a need to raise the pitch of the original sound signal $A_0$, enhancing the sound power of the mid-high frequency band to make the sound brighter, the equalization gain factor $K_0$ can be taken with a certain range of $K_0>1$ Conversely, when there is a need to lower the pitch of the original sound signal $A_0$, attenuating the sound power of the mid-high frequency band to make the sound duller, the equalization gain factor $K_0$ can be taken with another specified range of $$0 < K_0 < \frac{\sqrt{2}}{2}.$$

Additionally, when there is a need to cut off the mid-high frequency band for some specific effects, the equalization gain factor $K_0$ can be set by $K_0=0$.

After the users have determined the values of each parameter, the timbre equalization function C can be defined. The original sound signal $A_0$, after being filtered through the timbre equalization function C, will have its sound signal of low frequency band enhanced in loudness, while its sound signal of mid-high frequency band will receive timbre equalization gain. Finally, after filtering through the HRTF function, the result will be a virtual spatial sound with timbre equalization.

Based on the method of headphone virtual spatial sound playback of Embodiment 1, this embodiment also provides a device of headphone virtual spatial sound playback. The device includes a timbre equalization filter module and an HRTF filter module. The timbre equalization filter module is configured to acquire original sound signal $A_0$ and spatial orientation information of intended virtual sound source, then to perform timbre equalization filtering on the original sound signal $A_0$ through timbre equalization function C based on the spatial orientation information to obtain equalized sound signal $A_C$ The HRTF filter module is configured to receive the equalized sound signal A and filter it through HRTF function, to obtain left ear sound signal $A_L$ and right ear sound signal $A_R$.

Compared to prior art, this disclosure adjusts the input original sound signal $A_0$ by dividing it at the crossover point $f_0$, using the overall gain factor $G_0$ to adjust the overall sound pressure level across the entire frequency range, and the equalization gain factor $K_0$ to adjust the overall sound power in the mid-high frequency band. This ensures that the overall sound power of the left ear sound signal $A_L$ and right ear sound signal $A_R$, after being filtered through the HRTF function, remains approximately equal to the power of the input original sound signal $A_0$, thus improving the timbre. Additionally, the crossover point $f_0$, overall gain factor $G_0$, and equalization gain factor $K_0$ can be specially set according to specific requirements to adjust the overall loudness, pitch, and cut-off frequency range of the audio, thereby achieving different sound effects and meeting various listeners' needs.

Embodiment 2

Figure 7:
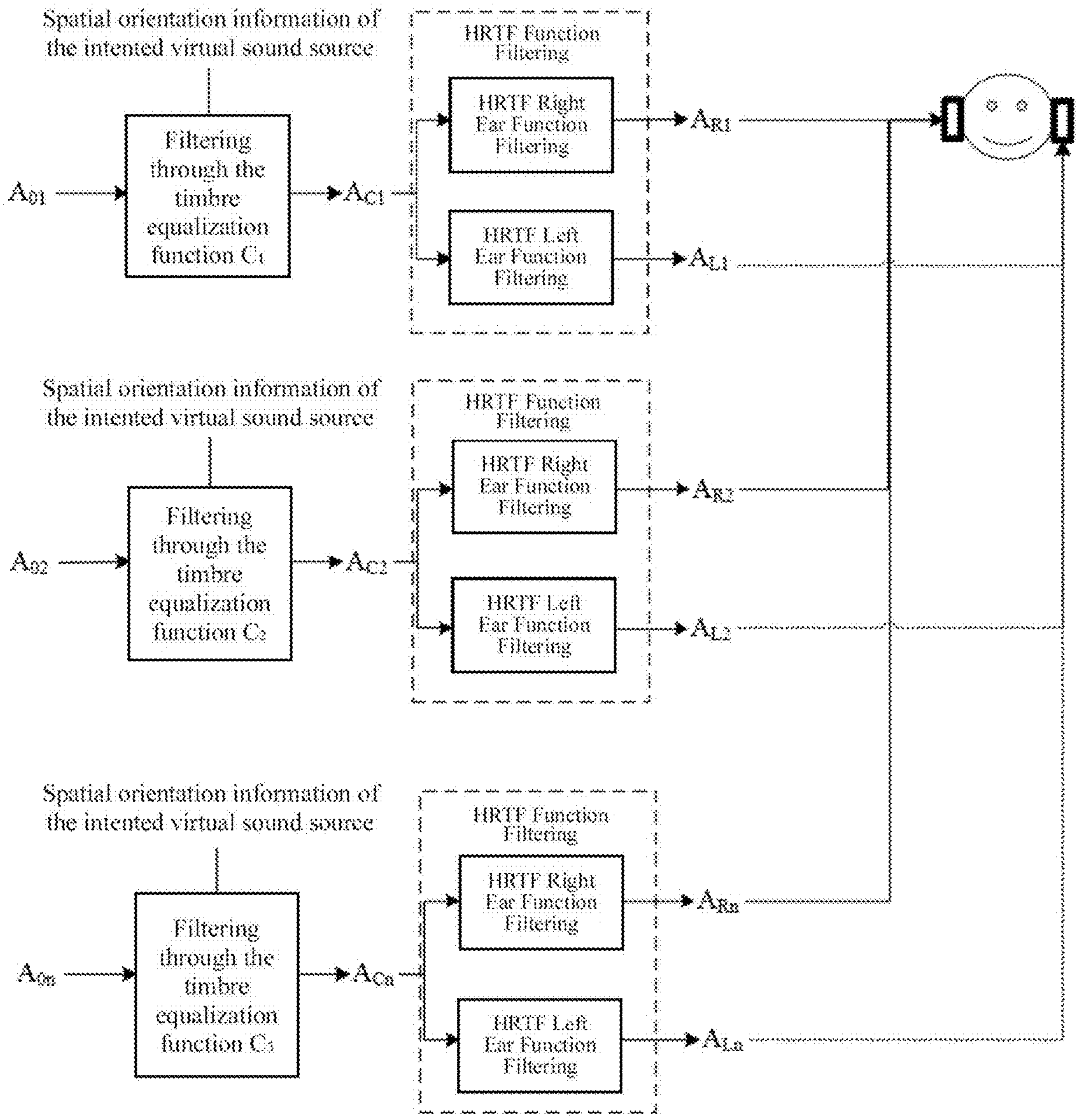
FIG. 7 is a flowchart of the method of headphone virtual spatial sound playback of Embodiment 2 of this disclosure.

Referring to FIG. 7, which is a flowchart of the method of headphone virtual spatial sound playback of Embodiment 2 of this disclosure. Embodiment 2 of the disclosure applies to a scenario simulating multi-channel surround sound. In the scenario, defining spatial orientations of multiple fixed intended virtual sound sources; meanwhile inputting multiple original sound signals equal to the number of the intended virtual sound sources through a player or system; according to the specific spatial orientations of the intended virtual sound sources; performing timbre equalization and spatial sound playback based on HRTF function for each original sound signal respectively; outputting multiple left ear sound signal and right ear sound signal though the left ear speaker and the right ear speaker of the headphones simultaneously, to achieve sound effect of stereo surround sound. The specific steps of the method are as follows:

S1: Acquiring original sound signals, which include n suboriginal sound signals, $A_{01}$, $A_{02}$, . . . , $A_{0n}$ and corresponding n spatial orientation information for n subintended virtual sound sources;

In the step of S1, each suboriginal sound signal $A_{0n}$ represents an input audio, n≥2. The spatial orientation information for the subintended virtual sound sources includes n subhorizontal orientation angles $\theta_1$, $\theta_2$, . . . , $\theta_n$ and subvertical orientation angles $\varphi_1$, $\varphi_2$, . . . , $\varphi_n$; each spatial orientation information corresponding to the suboriginal sound signals $A_{01}$, $A_{02}$, . . . , $A_{0n}$.

The subhorizontal orientation angles $\theta_1$, $\theta_2$, . . . , $\theta_n$, and subvertical orientation angles $\varphi_1$, $\varphi_2$, . . . , $\varphi_n$ are set to different fixed values according to actual scenario. For example, to simulate a 5.1 surround sound system, there are 6 input audios including a central channel, a front left channel, a front right channel, a rear left surround channel, a rear right surround channel and a subwoofer channel. The 6 input audios correspond to 6 suboriginal sound signals $A_{01}$, $A_{02}$, $A_{03}$, $A_{04}$, $A_{05}$, $A_{06}$. The subhorizontal orientation angles $\theta_1$, $\theta_2$, $\theta_3$, $\theta_4$, $\theta_5$, $\theta_6$ corresponding to the 6 sub original sound signals $A_{01}$, $A_{02}$, $A_{03}$, $A_{04}$, $A_{05}$, $A_{06}$ are set to 0°, 30°, −30°, 120°, −120°, 0°; and the subvertical orientation angles $\varphi_1$, $\varphi_2$, $\varphi_3$, $\varphi_4$, $\varphi_5$, $\varphi_6$ corresponding to the 6 sub original sound signals $A_{01}$, $A_{02}$, $A_{03}$, $A_{04}$, $A_{05}$, $A_{06}$ are set to 0°.

S2: Performing timbre equalization filtering on the suboriginal sound signals $A_{01}$, $A_{02}$, . . . , $A_{0n}$ to obtain the corresponding n subequalized sound signals $A_{C1}$, $A_{C2}$, . . . , $A_{Cn}$;

In the step of S2, performing timbre equalization filtering on each suboriginal sound signal $A_{01}$, $A_{02}$, . . . , $A_{0n}$ respectively through timbre equalization function $C_n$. The relationship between each subequalized sound signal $A_{Cn}$ and the suboriginal sound signal $A_{0n}$ is expressed by a formula $A_{Cn}=A_{0n}C_n$. The expression for the timbre equalization function Cn is defined as:

$$C_n = \begin{cases} G_{0n}, & f_n < f_{0n} \\ \frac{G_{0n}K_{0n}}{H_n}, & f_n \geq f_{0n} \end{cases};$$

wherein the selection of the crossover point $f_{0n}$, overall gain factor $G_{0n}$, and equalization gain factor $K_{0n}$, are similar to those in Embodiment 1 and are not repeated here. The crossover point $f_{0n}$, overall gain factor $G_{0n}$ and equalization gain factor $K_{0n}$ can be set differently for each suboriginal sound signal $A_{01}$, $A_{02}$, . . . , $A_{0n}$ to adjust overall sound power, achieving the desired sound playback effect.

S3: Filtering the each sub equalized sound signal $A_{C1}$, $A_{C2}$, . . . , $A_{Cn}$ through corresponding HRTF left ear function and HRTF right ear function of spatial orientation information of the n subintended virtual sound sources, and obtaining n subleft ear sound signals $A_{L1}$, $A_{L2}$, . . . , $A_{Ln}$ and n sub right ear sound signals $A_{R1}$, $A_{R2}$, . . . , $A_{Rn}$.

In the step of S3, each subequalized sound signal $A_{C1}$, $A_{C2}$, . . . , $A_{Cn}$ is filtered through its corresponding HRTF left ear function and HRTF right ear function, resulting in the subleft ear sound signals $A_{L1}$, $A_{L2}$, . . . , $A_{Ln}$ and the sub right ear sound signals $A_{R1}$, $A_{R2}$, . . . , $A_{Rn}$. The expression of the subleft ear sound signal $A_{Ln}$ and the sub equalized sound signal $A_{Cn}$ is $A_{Ln}=A_{Cn}H_{Ln}(\theta_n,\varphi_n,f_n)$. The expression of the subright ear sound signal $A_{Rn}$ and the sub equalized sound signal $A_{Cn}$ is $A_{Rn}=A_{Cn}H_{Rn}(\theta_n,\varphi_n,f_n)$ In practical implementation, combing the n subleft ear sound signals $A_{L1}$, $A_{L2}$, . . . , $A_{Ln}$ into a single left ear sound signal and outputting the single left ear sound signal through the left ear speaker of headphones; and combining the n subright ear sound signals $A_{R1}$, $A_{R2}$, . . . , $A_{Rn}$ into a single right ear sound signal and outputting the single right ear sound signal through the right ear speaker of headphones.

Based on the method of headphone virtual spatial sound playback of Embodiment 2, this embodiment also provides a corresponding device of headphone virtual spatial sound playback. The device of headphone virtual spatial sound playback includes n timbre equalization filter modules and n HRTF filter modules. Wherein the timbre equalization filter modules acquire n suboriginal sound signals $A_{01}$, $A_{02}$, . . . , $A_{0n}$ and the corresponding spatial orientation information for n subintended virtual sound sources; then based on the spatial orientation information of the intended virtual sound sources, perform timbre equalization filtering on each corresponding suboriginal sound signal $A_{01}$, $A_{02}$, . . . , $A_{0n}$ through timbre equalization function $C_n$, output subequalized sound signals $A_{C1}$, $A_{C2}$, . . . , $A_{Cn}$ respectively. The HRTF filter modules acquire the corresponding subequalized sound signals $A_{C1}$, $A_{C2}$, . . . , $A_{Cn}$ and filter them through HRTF function; then combine the obtained subleft ear sound signals $A_{L1}$, $A_{L2}$, . . . , $A_{Ln}$ into a single left ear signal for output; and similarly, combine obtained subright ear sound signals $A_{R1}$, $A_{R2}$, . . . , $A_{Rn}$ into a single right ear signal for output.

In Embodiment 2, this disclosure simultaneously processes multiple original sound signals, each of original sound signals corresponding to different spatial orientation information of intended virtual sound sources. The embodiment produces binaural sound signals with spatial playback effects after timbre equalization, allowing the listener to perceive multiple sounds originating from specific spatial locations. Based on this, the disclosure can be applied in scenario simulating multi-channel surround sound, achieving a surround sound effect that would typically require multiple speakers through headphones. Especially when the original sound signals are of high-quality audio, the disclosure can create an immersive experience akin to being in a cinema.

Based on the method of headphone virtual spatial sound playback of Embodiments 1 and 2, this disclosure also provides a storage medium of headphone virtual spatial sound playback. This storage medium, as a computer-readable storage medium, is mainly used to store programs, which can be the program codes corresponding to the methods in Embodiments 1 and 2.

Furthermore, based on the method of headphone virtual spatial sound playback of Embodiments 1 and 2, this disclosure also provides headphones with virtual spatial sound playback effects. The headphones include a device of headphone virtual spatial sound playback, a left ear speaker, and a right ear speaker. The device of headphone virtual spatial sound playback corresponds to the devices in Embodiments 1 and 2, and the left ear speaker and right ear speaker are configured to output the left ear sound signal and right ear sound signal from the device of headphone virtual spatial sound playback to the outside of the headphones.

In line with the same inventive concept, this disclosure also provides a method of timbre equalization in virtual spatial sound playback. This method includes performing timbre equalization filtering on the original sound signal $A_0$ through timbre equalization function C based on spatial orientation information of intended virtual sound source before filtering through HRTF function, to obtain equalized sound signal $A_C$. The timbre equalization function C is the same as in Embodiments 1 and 2 and is not repeated here.

This disclosure can be implemented using general DSP hardware circuits or software code, or as part of a head-related transfer function database in HRTF/HRIR data files. The methods of this disclosure can be applied in headphones and in free-field conditions using HRTF/HRIR. This disclosure is not limited to the aforementioned embodiments. If various modifications or transformations of this disclosure do not depart from the spirit and scope of the disclosure, and if these modifications and transformations fall within the claims and equivalent technical scope of this disclosure, they are also intended to be included within this disclosure.

What is claimed:

1. A device of headphone virtual spatial sound playback, comprising:

a timbre equalization filter module and an HRTF filter module;

the timbre equalization filter module is configured to obtain an original sound signal $A_0$ from a player and preset spatial orientation information of an intended virtual sound source, to perform filtering on the original sound signal $A_0$ through a timbre equalization function C based on the spatial orientation information of the intended virtual sound source, and to obtain an equalized sound signal $A_C$;

the HRTF filter module is configured to filter the equalized sound signal $A_C$ through an HRTF function, and to output a left ear sound signal $A_L$ and a right ear sound signal $A_R$;

wherein, the spatial orientation information of the intended virtual sound source comprises a horizontal orientation angle θ and a vertical orientation angle φ; the relationship between the equalized sound signal $A_C$ and the original sound signal $A_0$ is expressed as: $A_C = A_0 C$;

the timbre equalization function C is expressed as:

$$C = \begin{cases} G_0, & f < f_0 \\ \dfrac{G_0 K_0}{H}, & f \geq f_0 \end{cases},$$

wherein f is frequency of the original sound signal $A_0$, $f_0$ is a crossover point, H is amplitude spectrum of the HRTF function, $K_0$ is an equalization gain factor, $G_0$ is an overall gain factor.

2. The device of headphone virtual spatial sound playback of claim 1, wherein the original sound signal comprises at least two parallel suboriginal sound signals, each of the suboriginal sound signals corresponding to spatial orientation information of a sub intended virtual sound source; performing filtering on each of the suboriginal sound signals through the timbre equalization function C to obtain the corresponding subequalized sound signal; then filtering each subequalized sound signal through the HRTF function to obtain the corresponding subleft ear sound signal andsubright ear sound signal.

3. The device of headphone virtual spatial sound playback of claim 1, wherein the value of the crossover point $f_0$ is any frequency value within a specific range of 400 Hz≤$f_0$≤1.5 kHz.

4. The device of headphone virtual spatial sound playback of claim 1, wherein the expression of the equalization gain factor $K_0$ is:

$$K_0 = \begin{cases} 1, & -150° \leq \theta \leq -30° \cup 30° \leq \theta \leq 150° \\ \dfrac{H_{f_0}}{\sqrt{|H_{Lf_0}|^2 + |H_{Rf_0}|^2}}, & -180° \leq \theta < -150° \cup -30° < \theta < 30° \cup 150° < \theta \leq 180° \end{cases},$$

wherein $H_{f_0}$ is the value $H(\theta,\varphi,f_0)$ of the amplitude spectrum H of the HRTF function at the crossover point $f_0$, $H_{Lf_0}$ is the value $H_L(\theta,\varphi, f_0)$ of HRTF left ear function at the crossover point $f_0$ $H_{Rf_0}$ is the value $H_R(\theta,\varphi,f_0)$ of HRTF right ear function at the crossover point $f_0$.

5. The device of headphone virtual spatial sound playback of claim 4, wherein the expression of the equalization gain factor $K_0$ is $$K_0 = \begin{cases} 1, & -150° \leq \theta \leq -30° \cup 30° \leq \theta \leq 150° \\ \left[\dfrac{\sqrt{2}}{2}, 1\right), & -180° \leq \theta < -150° \cup -30° < \theta < 30° \cup 150° < \theta \leq 180° \end{cases}.$$

6. The device of headphone virtual spatial sound playback of claim 1, wherein the left ear sound signal $A_L$ is expressed as:

$$A_L=\begin{cases} A_0G_0H_L(\theta,\varphi,f), & f<f_0 \\ A_0\dfrac{G_0}{\sqrt{|H_L(\theta,\varphi,f)|^2}}H_L(\theta,\varphi,f), & f\ge f_0\cap 30^\circ\le\theta\le 150^\circ \\ A_0\dfrac{G_0}{\sqrt{|H_R(\theta,\varphi,f)|^2}}H_L(\theta,\varphi,f), & f\ge f_0\cap -150^\circ\le\theta\le -30^\circ \\ A_0\dfrac{G_0H_{f_0}}{\sqrt{|H_L(\theta,\varphi,f)|^2}\sqrt{|H_{Lf_0}|^2+|H_{Rf_0}|^2}}H_L(\theta,\varphi,f), & f\ge f_0\cap(0^\circ<\theta<30^\circ\cup 150^\circ<\theta\le 180^\circ) \\ A_0\dfrac{G_0H_{f_0}}{\sqrt{|H_R(\theta,\varphi,f)|^2}\sqrt{|H_{Lf_0}|^2+|H_{Rf_0}|^2}}H_L(\theta,\varphi,f), & f\ge f_0\cap(-180^\circ\le\theta<-150^\circ\cup -30^\circ<\theta<0^\circ) \end{cases},$$

the right ear sound signal $A_R$ is expressed as:

$$A_R=\begin{cases} A_0G_0H_R(\theta,\varphi,f), & f<f_0 \\ A_0\dfrac{G_0}{\sqrt{|H_L(\theta,\varphi,f)|^2}}H_R(\theta,\varphi,f), & f\ge f_0\cap 30^\circ\le\theta\le 150^\circ \\ A_0\dfrac{G_0}{\sqrt{|H_R(\theta,\varphi,f)|^2}}H_R(\theta,\varphi,f), & f\ge f_0\cap -150^\circ\le\theta\le -30^\circ \\ A_0\dfrac{G_0H_{f_0}}{\sqrt{|H_L(\theta,\varphi,f)|^2}\sqrt{|H_{Lf_0}|^2+|H_{Rf_0}|^2}}H_R(\theta,\varphi,f), & f\ge f_0\cap(0^\circ<\theta<30^\circ\cup 150^\circ<\theta\le 180^\circ) \\ A_0\dfrac{G_0H_{f_0}}{\sqrt{|H_R(\theta,\varphi,f)|^2}\sqrt{|H_{Lf_0}|^2+|H_{Rf_0}|^2}}H_R(\theta,\varphi,f), & f\ge f_0\cap(-180^\circ\le\theta<-150^\circ\cup -30^\circ<\theta<0^\circ) \end{cases}.$$

7. Headphones with virtual spatial sound playback effect, comprising:

a device of headphone virtual spatial sound playback, a left ear speaker, and a right ear speaker;

the device of headphone virtual spatial sound playback comprises a timbre equalization filter module and an HRTF filter module;

the timbre equalization filter module is configured to obtain an original sound signal $A_0$ from a player and preset spatial orientation information of an intended virtual sound source, to perform filtering on the original sound signal $A_0$ through a timbre equalization function C based on the spatial orientation information of the intended virtual sound source, and to obtain an equalized sound signal $A_C$;

the HRTF filter module is configured to filter the equalized sound signal $A_C$ through an HRTF function, and to output a left ear sound signal $A_L$ and a right ear sound signal $A_R$;

wherein, the spatial orientation information of the intended virtual sound source comprises a horizontal orientation angle θ and a vertical orientation angle φ; the relationship between the equalized sound signal $A_C$ and the original sound signal $A_0$ is expressed as:

$$A_C=A_0C;$$

the timbre equalization function C is expressed as:

$$C=\begin{cases} G_0, & f<f_0 \\ \dfrac{G_0K_0}{H}, & f\ge f_0 \end{cases},$$

wherein f is frequency of the original sound signal $A_0$, $f_0$ is a crossover point, H is amplitude spectrum of the HRTF function, $K_0$ is an equalization gain factor, $G_0$ is an overall gain factor.

8. The headphones with virtual spatial sound playback effect of claim 7, wherein the original sound signal comprises at least two parallel suboriginal sound signals, each of the suboriginal sound signals corresponding to spatial orientation information of a sub intended virtual sound source; performing filtering on each of the suboriginal sound signals through the timbre equalization function C to obtain the corresponding subequalized sound signal; then filtering each subequalized sound signal through the HRTF function to obtain the corresponding subleft ear sound signal and subright ear sound signal.

9. The headphones with virtual spatial sound playback effect of claim 7, wherein the value of the crossover point $f_0$ is any frequency value within a specific range of 400 Hz≤$f_0$≤1.5 kHz.

10. The headphones with virtual spatial sound playback effect of claim 7, wherein the expression of the equalization gain factor $K_0$ is:

$$K_0 = \begin{cases} 1, & -150^\circ \le \theta \le -30^\circ \cup 30^\circ \le \theta \le 150^\circ \\ \dfrac{H_{f_0}}{\sqrt{|H_{Lf_0}|^2 + |H_{Rf_0}|^2}}, & -180^\circ \le \theta < -150^\circ \cup -30^\circ < \theta < 30^\circ \cup 150^\circ < \theta \le 180^\circ \end{cases},$$

wherein $H_{f_0}$ is the value $H(\theta,\varphi,f_0)$ of the amplitude spectrum H of the HRTF function at the crossover point $f_0$, $H_{Lf_0}$ is the value $H_L(\theta,\varphi,f_0)$ of HRTF left ear function at the crossover point $f_0$, $H_{Rf_0}$ is the value $H_R(\theta,\varphi,f_0)$ of HRTF right ear function at the crossover point $f_0$.

11. The headphones with virtual spatial sound playback effect of claim 10, wherein the expression of the equalization gain factor $K_0$ is $$K_0 = \begin{cases} 1, & -150^\circ \le \theta \le -30^\circ \cup 30^\circ \le \theta \le 150^\circ \\ \left[\dfrac{\sqrt{2}}{2}, 1\right], & -180^\circ \le \theta < -150^\circ \cup -30^\circ < \theta < 30^\circ \cup 150^\circ < \theta \le 180^\circ \end{cases}.$$

12. A method of timbre equalization in virtual spatial sound playback, comprising:

before filtering an original sound signal $A_0$ from a player through an HRTF function, filtering the original sound signal $A_0$ through a timbre equalization function C based on preset spatial orientation information of an intended virtual sound source, to obtain an equalized sound signal $A_C$;

wherein, the spatial orientation information of the intended virtual sound source comprises a horizontal orientation angle θ and a vertical orientation angle φ; the relationship between the equalized sound signal $A_C$ and the original sound signal $A_0$ is expressed as:

$$A_C = A_0 C;$$

the timbre equalization function C is expressed as:

$$C = \begin{cases} G_0, & f < f_0 \\ \dfrac{G_0 K_0}{H}, & f \ge f_0 \end{cases},$$

wherein f is frequency of the original sound signal $A_0$, $f_0$ is a crossover point, H is amplitude spectrum of the HRTF function, $K_0$ is an equalization gain factor, $G_0$ is an overall gain factor.

13. The method of timbre equalization in virtual spatial sound playback of claim 12, wherein the original sound signal comprises at least two parallel suboriginal sound signals, each of the suboriginal sound signals corresponding to spatial orientation information of a sub intended virtual sound source; performing filtering on each of the suboriginal sound signals through the timbre equalization function C to obtain the corresponding subequalized sound signal; then filtering each subequalized sound signal through the HRTF function to obtain the corresponding subleft ear sound signal andsubright ear sound signal.

14. The method of timbre equalization in virtual spatial sound playback of claim 12, wherein the value of the crossover point $f_0$ is any frequency value within a specific range of 400 Hz≤$f_0$≤1.5 kHz.

15. The method of timbre equalization in virtual spatial sound playback of claim 12, wherein the expression of the equalization gain factor $K_0$ is:

$$K_0 = \begin{cases} 1, & -150^\circ \le \theta \le -30^\circ \cup 30^\circ \le \theta \le 150^\circ \\ \dfrac{H_{f_0}}{\sqrt{|H_{Lf_0}|^2 + |H_{Rf_0}|^2}}, & -180^\circ \le \theta < -150^\circ \cup -30^\circ < \theta < 30^\circ \cup 150^\circ < \theta \le 180^\circ \end{cases},$$

wherein $H_{f_0}$ is the value $H(\theta,\varphi,f_0)$ of the amplitude spectrum H of the HRTF function at the crossover point $f_0$, $H_{Lf_0}$ is the value $H_L(\theta,\varphi,f_0)$ of HRTF left ear function at the crossover point $f_0$, $H_{Rf_0}$ is the value $H_R(\theta,\varphi,f_0)$ of HRTF right ear function at the crossover point $f_0$.

16. The method of timbre equalization in virtual spatial sound playback of claim 15, wherein the expression of the equalization gain factor $K_0$ is $$K_0 = \begin{cases} 1, & -150^\circ \le \theta \le -30^\circ \cup 30^\circ \le \theta \le 150^\circ \\ \left[\dfrac{\sqrt{2}}{2}, 1\right], & -180^\circ \le \theta < -150^\circ \cup -30^\circ < \theta < 30^\circ \cup 150^\circ < \theta \le 180^\circ \end{cases}.$$

17. The method of timbre equalization in virtual spatial sound playback of claim 12, wherein the left ear sound signal $A_L$ is expressed as:

$$A_L = \begin{cases} A_0 G_0 H_L(\theta, \varphi, f), & f < f_0 \\ A_0 \dfrac{G_0}{\sqrt{|H_L(\theta, \varphi, f)|^2}} H_L(\theta, \varphi, f), & f \ge f_0 \cap 30^\circ \le \theta \le 150^\circ \\ A_0 \dfrac{G_0}{\sqrt{|H_R(\theta, \varphi, f)|^2}} H_L(\theta, \varphi, f), & f \ge f_0 \cap -150^\circ \le \theta \le -30^\circ \\ A_0 \dfrac{G_0 H_{f_0}}{\sqrt{|H_L(\theta, \varphi, f)|^2} \sqrt{|H_{Lf_0}|^2 + |H_{Rf_0}|^2}} H_L(\theta, \varphi, f), & f \ge f_0 \cap (0^\circ < \theta < 30^\circ \cup 150^\circ < \theta \le 180^\circ) \\ A_0 \dfrac{G_0 H_{f_0}}{\sqrt{|H_R(\theta, \varphi, f)|^2} \sqrt{|H_{Lf_0}|^2 + |H_{Rf_0}|^2}} H_L(\theta, \varphi, f), & f \ge f_0 \cap (-180^\circ \le \theta < -150^\circ \cup -30^\circ < \theta < 0^\circ) \end{cases},$$

the right ear sound signal $A_R$ is expressed as:

$$A_R = \begin{cases} A_0 G_0 H_R(\theta, \varphi, f), & f < f_0 \\ A_0 \dfrac{G_0}{\sqrt{|H_L(\theta, \varphi, f)|^2}} H_R(\theta, \varphi, f), & f \geq f_0 \cap 30° \leq \theta \leq 150° \\ A_0 \dfrac{G_0}{\sqrt{|H_R(\theta, \varphi, f)|^2}} H_R(\theta, \varphi, f), & f \geq f_0 \cap -150° \leq \theta \leq -30° \\ A_0 \dfrac{G_0 H_{f_0}}{\sqrt{|H_L(\theta, \varphi, f)|^2} \sqrt{|H_{Lf_0}|^2 + |H_{Rf_0}|^2}} H_R(\theta, \varphi, f), & f \geq f_0 \cap (0° < \theta < 30° \cup 150° < \theta \leq 180°) \\ A_0 \dfrac{G_0 H_{f_0}}{\sqrt{|H_R(\theta, \varphi, f)|^2} \sqrt{|H_{Lf_0}|^2 + |H_{Rf_0}|^2}} H_R(\theta, \varphi, f), & f \geq f_0 \cap (-180° \leq \theta < -150° \cup -30° < \theta < 0°) \end{cases}.$$

* * * * *